(12) United States Patent
Pratt (10) Patent No.: US 10,766,321 B2
(45) Date of Patent: Sep. 8, 2020

(54) HITCH IT SAFE TRAILER HITCH

(71) Applicant: Karl Glenn Pratt, Forth Worth, TX (US)

(72) Inventor: Karl Glenn Pratt, Forth Worth, TX (US)

( * ) Notice: Subject to any disclaimer, the term of this patent is extended or adjusted under 35 U.S.C. 154(b) by 161 days.

(21) Appl. No.: 16/009,641

(22) Filed: Jun. 15, 2018

(65) Prior Publication Data

US 2018/0304708 A1    Oct. 25, 2018

Related U.S. Application Data

(63) Continuation-in-part of application No. 12/484,908, filed on Jun. 15, 2009, now abandoned.

(51) Int. Cl.
| | |
|---|---|
| *B60D 1/60* | (2006.01) |
| *B60D 1/36* | (2006.01) |
| *B60R 25/00* | (2013.01) |
| *B60D 1/167* | (2006.01) |
| *B60D 1/56* | (2006.01) |
| *B60D 1/28* | (2006.01) |
| *B60D 1/58* | (2006.01) |
| *B60D 1/06* | (2006.01) |
| *B60R 11/00* | (2006.01) |

(52) U.S. Cl.
CPC .............. *B60D 1/363* (2013.01); *B60D 1/06* (2013.01); *B60D 1/167* (2013.01); *B60D 1/28* (2013.01); *B60D 1/56* (2013.01); *B60D 1/583* (2013.01); *B60D 1/60* (2013.01); *B60R 25/001* (2013.01); *B60R 2011/0096* (2013.01)

(58) Field of Classification Search
CPC ... B60D 1/06; B60D 1/28; B60D 1/56; B60D 1/583; B60D 1/60
See application file for complete search history.

(56) References Cited

U.S. PATENT DOCUMENTS

| | | | | |
|---|---|---|---|---|
| 4,577,884 | A | * 3/1986 | Harris ................... | B60D 1/065 280/507 |
| 4,730,841 | A | * 3/1988 | Ponder ................... | B60D 1/60 280/501 |
| 4,836,570 | A | * 6/1989 | Lopez ..................... | B60D 1/60 280/507 |

(Continued)

*Primary Examiner* — Kevin Hurley
*Assistant Examiner* — Marlon A Arce
(74) *Attorney, Agent, or Firm* — Lyman Moulton, Esq; Moulton Patents, PLLC (57) ABSTRACT

A disclosed trailer hitch device includes an upper member to restrain the movement of the trailer hitch and a lower member to connect to the upper member and to connect to a vehicle. The upper member is rotatably connected to the lower member. The upper member is substantially U-shaped. The lower member is also substantially U-shaped and substantially symmetrical to the upper member. The upper and lower members include a respective side section, a respective arm section and a respective connecting plate configured to restrain the upper member from rotating with respect to the lower member. The upper connecting plate is connected to the lower connecting plate with a fastening device. A single component step washer includes a flanging washer concentric with a collar washer, the flanging washer comprising a ball mounting surface. The collar washer is configured to fit rotatably inside the hitching aperture of the lower member.

14 Claims, 8 Drawing Sheets

(56) References Cited

U.S. PATENT DOCUMENTS

| | | | | |
|---|---|---|---|---|
| 5,584,495 | A | * | 12/1996 | Mason ..................... B60D 1/60 280/507 |
| 5,700,024 | A | * | 12/1997 | Upchurch ................ B60D 1/60 280/507 |
| 5,775,139 | A | * | 7/1998 | Sellers ..................... B60D 1/60 280/507 |
| 6,062,583 | A | * | 5/2000 | Lauricella, Jr. .......... B60D 1/06 280/507 |
| 6,382,657 | B1 | * | 5/2002 | Lynn ..................... B60D 1/065 280/457 |
| 6,637,765 | B2 | * | 10/2003 | Barton .................. B60D 1/065 280/432 |
| 7,121,121 | B2 | * | 10/2006 | Wyers ................... B60D 1/065 70/14 |
| 7,246,810 | B2 | * | 7/2007 | Bussiere ................ B60D 1/60 280/507 |
| 7,635,143 | B2 | * | 12/2009 | Pappalardo ............. B60D 1/60 280/507 |
| 2003/0068213 | A1 | * | 4/2003 | Janisch, Jr. ............ F16B 33/00 411/433 |
| 2003/0189313 | A1 | * | 10/2003 | Sievers ................... B60D 1/06 280/507 |
| 2008/0067783 | A1 | * | 3/2008 | Rousseau ................ B60D 1/60 280/507 |
| 2009/0315298 | A1 | * | 12/2009 | Rasset ..................... B60D 1/02 280/507 |

* cited by examiner

HITCH IT SAFE TRAILER HITCH

CROSS REFERENCE

The present disclosure is a Continuation in Part (CIP) of revived U.S. patent application 2010/0230932, U.S. application Ser. No. 12/484,908 by Karl Pratt, filed Jun. 15, 2009 which claims priority under 35 USC section 119 based upon a provisional application with a Ser. No. of 61/159,135 which was filed on Mar. 11, 2009 also by Karl Pratt.

BACKGROUND OF THE INVENTION

Often, the hitch ball of a conventional hitch assembly is mounted on a tow bar, and the tow bar is slidably received in a receiver channel that is secured to the vehicle. The tow bar is releasably secured in the receiver channel when the vehicle is towing a trailer, and is removed from the channel and stored when not in use. However, for the most part, the two component parts of a conventional trailer hitch assembly are fixedly secured to either the tow vehicle or the trailer, and are not capable of being moved relative to the tow vehicle or trailer to which they are secured.

Typically when a trailer is attached to the vehicle, the trailer hitch may include a set of metal chains to secure the trailer to the vehicle. These chains often provide an effective security device, but may be a nuisance to use and a safety hazard. If the trailer becomes unattached from the trailer ball, the flexibility of the chains may result in the trailer becoming unstable and may result in the vehicle overturning or losing control. These chains may need to be replaced regularly and consequently the chains may be a liability and a nuisance to use.

SUMMARY OF THE INVENTION

A trailer hitch guide for restraining a trailer hitch may include an upper member to restrain the movement of the trailer hitch and a lower member to connect to the upper member and to connect to a vehicle. The upper member may be rotatably connected to the lower member. The upper member may be substantially U-shaped. The lower member may be substantially U-shaped. The upper member may include a upper side section. The upper side section may include a upper arm section. The lower member may include a lower side section. The lower side section may include a lower arm section. The upper arm section may be connected to a upper connecting plate. The lower arm section may be connected to a lower arm connecting plate which may cooperate with the upper connecting plate to restrain the upper member from rotating with respect to the lower member. The upper connecting plate may be connected to the lower connecting plate with a fastening device. The fastening device may be a bolt and nut. The trailer hitch guide may include a locking device to prevent the rotation of the upper member with respect to the lower member. The lower member may include a aperture to accommodate a hitching device.

Also, a trailer hitch restraining device comprising a single component step washer is disclosed. The device comprises an upper member configured to restrain a movement of the trailer hitch. The device also includes a lower member defining a hitching aperture and configured to connect to the upper member and to connect to a vehicle, wherein the upper member is rotatably connected to the lower member. The device further includes a step washer including a flanging washer concentric with a collar washer, the flanging washer comprising a ball mounting surface, the collar washer configured to fit rotatably inside the hitching aperture of the lower member.

Other aspects and advantages of embodiments of the disclosure will become apparent from the following detailed description, taken in conjunction with the accompanying drawings, illustrated by way of example of the principles of the disclosure herein.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term "holder" refers to any container object or device such as a cup, receptacle, housing, sheath, case, basket and cage that may be used to hold and carry something, particularly a personal digital assistant such as a cell phone, personal effects such as head phones, or a water bottle.

Figure 1:
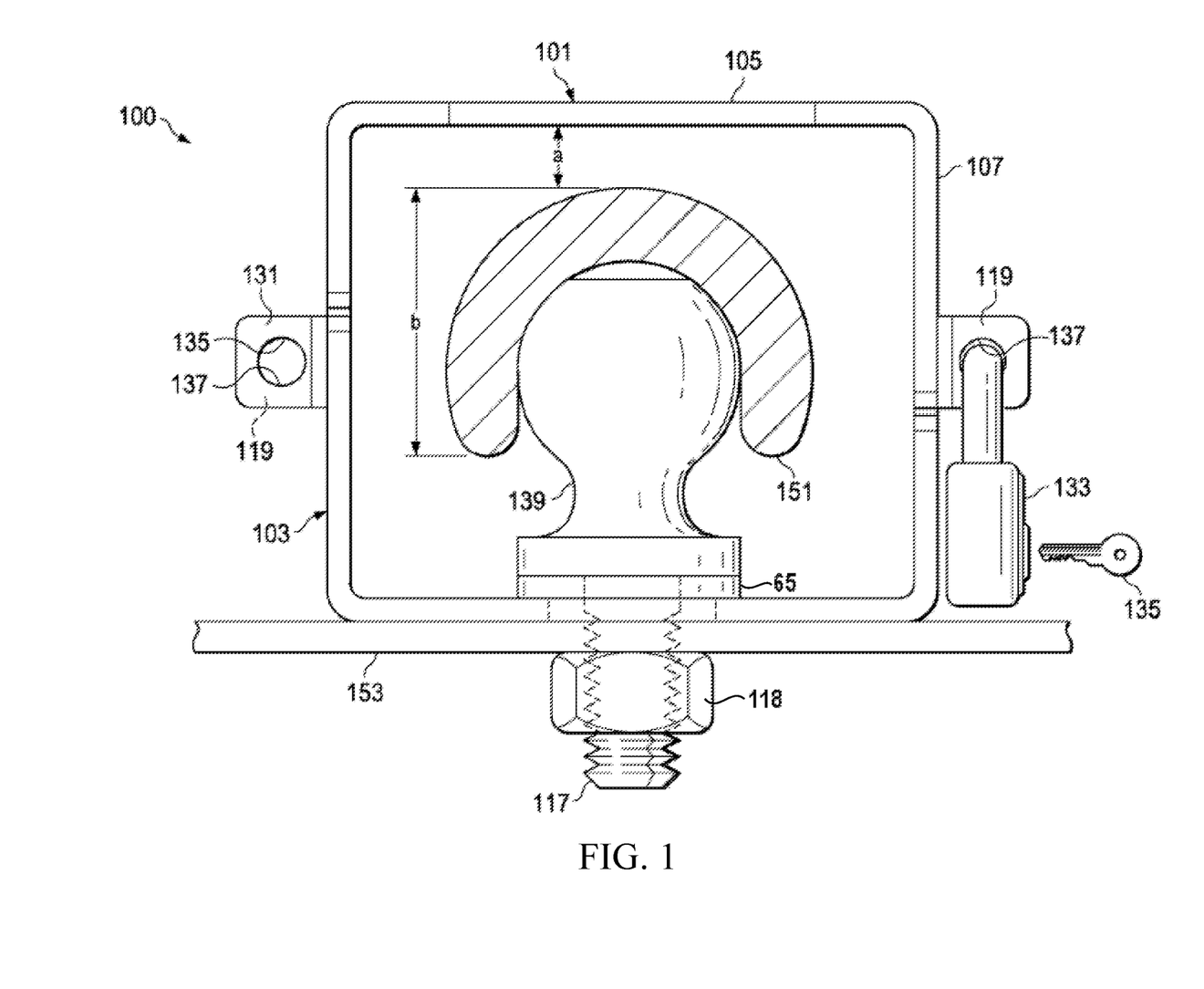
FIG. 1 illustrates a perspective view of the safety sentry in accordance with an embodiment of the present invention.

FIG. 1 illustrates a front perspective view of the safety sentry 100 which may be a trailer hitch guide to retain a trailer hitch 151 being used in conjunction with a hitching device 139 which may be a hitching ball and which may be connected to a trailer hitch 151 in a first position which may be closed. The hitching device 139 may be connected to a bumper 153 of a vehicle or other connection points to the vehicle which may include a fifth wheel. The safety sentry 100 may be formed from rigid material such as metal plates and/or sheets and may be formed from integral portions or welded portions. FIG. 1 illustrates that the safety sentry 100 may include an upper member 101 which may be substantially an inverted U-shaped member or may be a curved shape member or other appropriate shape and a lower member 103 which may be a substantially U-shaped member or may be a curved shape member or other appropriate shape.

The upper member 101 may include an upper top section 105 which may extend between a pair of opposing upper side sections 107 which may terminate in a downward extending upper arm member 109 which may connect to a upper connecting plate 119 to connect to a lower connecting plate 131.

The lower member 103 may include a lower bottom section 111 (see FIG. 2) which may extend between opposing lower side section 113 which may terminate in a upward extending lower arm section 115 to connect to the lower connecting plate 131 to connect to the upper connecting plate 119. The lower bottom section 111 may include a hitching device aperture 155 to cooperate with a shaft of a hitching device 139.

The upper connecting plate 119 may include an upper aperture 135 to cooperate with a lower aperture 137 of the lower connecting plate 131. A fastening device 117 such as a bolt may extend through the upper aperture 135 and the lower aperture 137 in order to connect the upper member 101 to the lower member 103.

FIG. 1 additionally illustrates a locking device 133 and key 135 to lock the safety sentry 100 so that the upper member 101 cannot be disconnected from the lower member 103.

FIG. 1 illustrates that the space 'a' between the apex of the trailer hitch 151 and the bottom surface of the upper top section 105 is sufficiently small so that if the vehicle or trailer should hit a bump or other obstacle the trailer hitch 151 cannot be raised sufficiently in order for the trailer hitch 151 to clear the hitching device 139 as shown by the distance 'b'. Consequently, the trailer hitch 151 is impeded from leaving the trailer hitch 151 by the interaction of the bottom surface of the upper top section 105 and the trailer hitch 151. This eliminates the need for chains and the associated problems with these chains.

The ratio 'a' to 'b' denoted a/b determines a safety margin to failure and is adjustable via spacers between a base of the hitch ball and the disclosed device. A nominal ratio of 1 to 4.333 comprises an embodiment of the disclosure. These spacers can be washers and more importantly snap rings etc put into place during hitching to further maximize safety. The arc clearance above the ball hitch covers more of the ball hitch than a straight line enclosure due to the acute inner angles of intersecting vertices. This makes the disclosed device safer than conventional devices. The disclosed device may be opened and locked from the left or from the right to accommodate left or right handed operators and other obstacles. Conventional devices can only be locked from one predetermined side.

Figure 2:
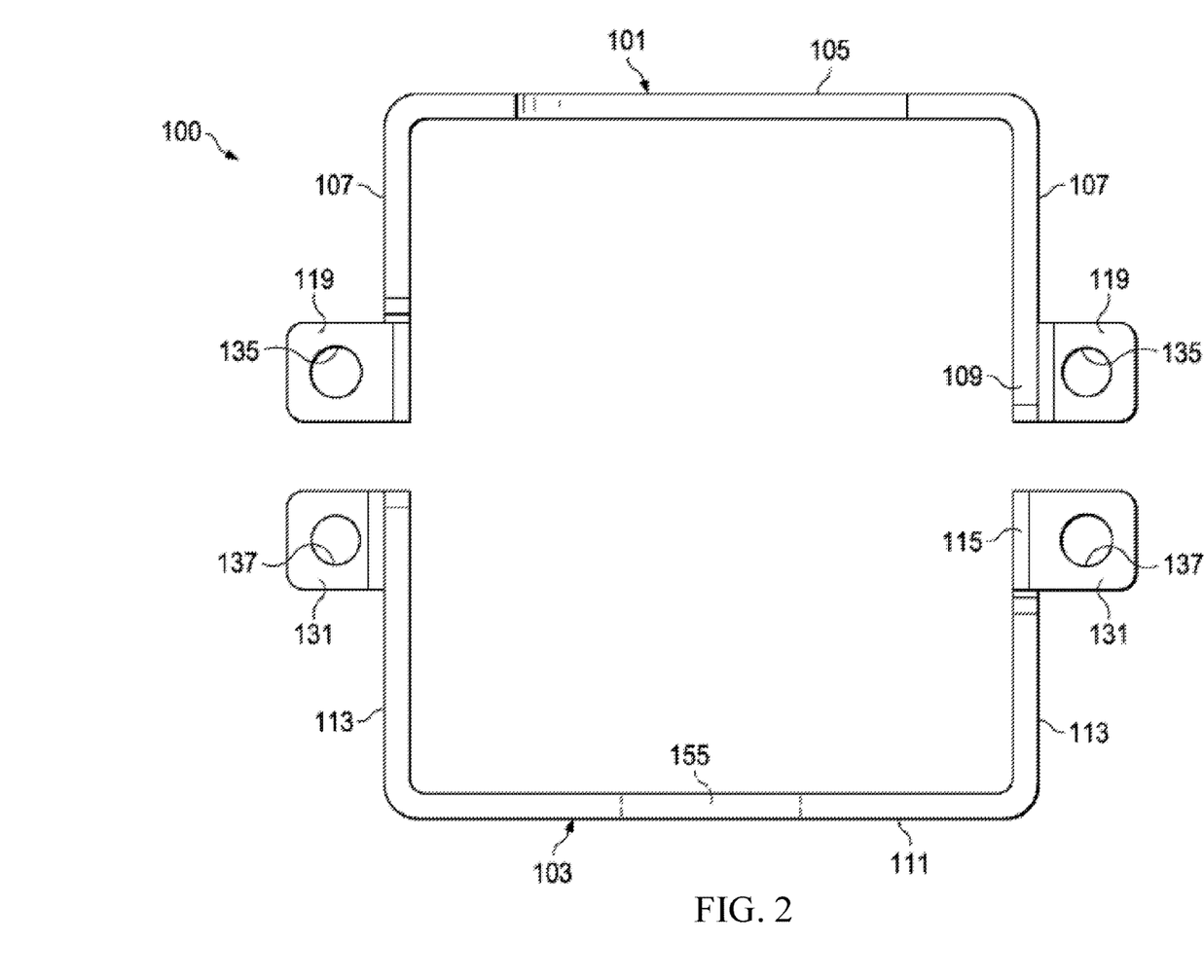
FIG. 2 illustrates an exploded view of the safety sentry in accordance with an embodiment of the present invention.

FIG. 2 illustrates an exploded front view of the safety sentry 100. FIG. 2 also illustrates that the safety sentry 100 may include an upper member 101 which may be substantially an inverted U-shaped member or may be a curved shape member or other appropriate shape and a lower member 103 which may be a substantially U-shaped member or may be a curved shape member or other appropriate shape. An embodiment of the trailer hitch guide for restraining a trailer hitch comprises the upper member and the lower member being substantially symmetrical.

The upper member 101 may include an upper top section 105 which may extend between a pair of opposing upper side sections 107 which may terminate in a downward extending upper arm member 109 which may connect to a upper connecting plate 119 to connect to a lower connecting plate 131.

The lower member 103 may include a lower bottom section 111 which may extend between opposing lower side section 113 which may terminate in a upward extending lower arm section 115 to connect to the lower connecting plate 131 to connect to the upper connecting plate 119. The lower bottom section 111 may include a hitching device aperture 155 to cooperate with a shaft of a hitching device 139 as shown in FIG. 1.

Figure 3:
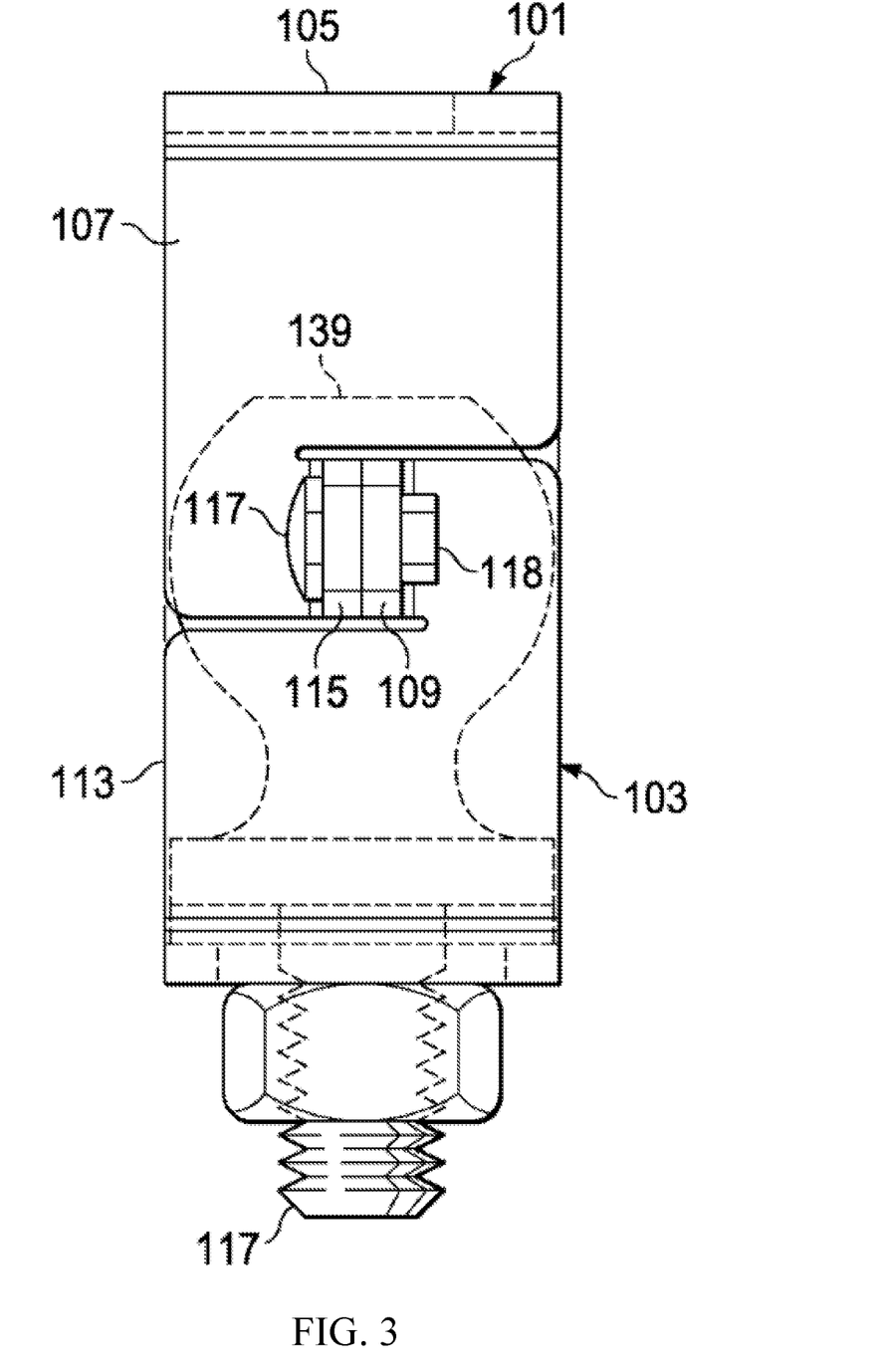
FIG. 3 illustrates a side view of the safety sentry in accordance with an embodiment of the present invention.

The upper connecting plate 119 may include an upper aperture 135 to cooperate with a lower aperture 137 of the lower connecting plate 131. A fastening device 117 is shown in FIG. 3 such as a bolt may extend through the upper aperture 135 and the lower aperture 137 in order to connect the upper member 101 to the lower member 103. The bolt 117 may be connected to a nut 118.

FIG. 3 illustrates a side view of the safety sentry 100 and illustrates the upper side section 107 and the upper arm section 109 extending from the upper side section 107. FIG. 3 additionally illustrates the lower side section 113 and the lower arm section 115 which extends from the lower side section 113. FIG. 3 additionally illustrates the fastening device 117 and the nut 118.

Figure 4:
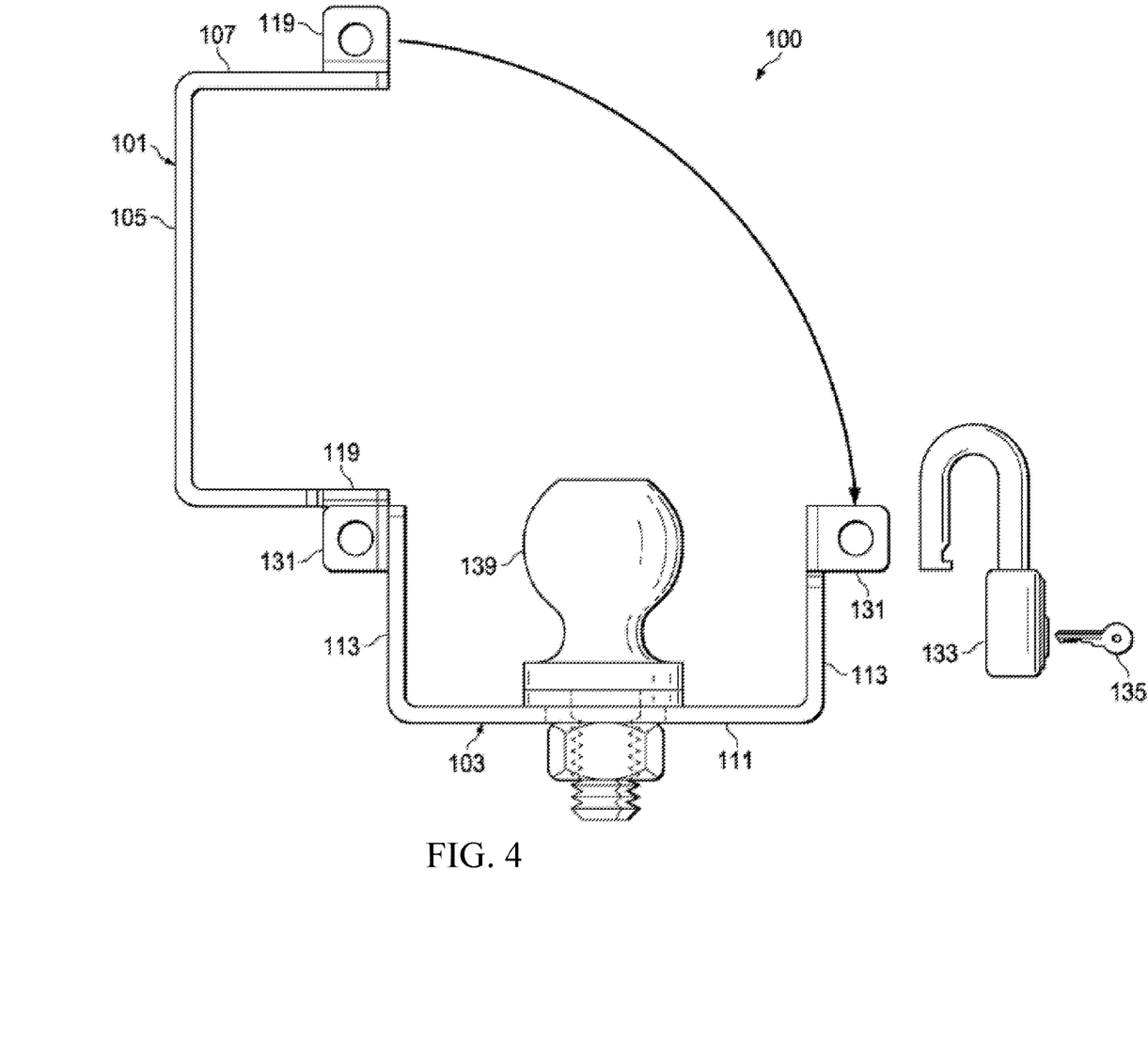
FIG. 4 illustrates a cross-sectional view of the safety sentry in an open position in accordance with an embodiment of the present invention.

FIG. 4 illustrates a cross section view of the safety sentry 100 being used in conjunction with a hitching device 139 which may be a hitching ball and which may be connected to a trailer hitch 151 in a second position which may be open. FIG. 4 illustrates that the top section 105 has been rotated with respect to the bottom section 111 so that the trailer hitch 151 as illustrated in FIG. 1 may be removed or inserted on the hitching device 139.

The hitching device 139 may be connected to a bumper 153 as shown in FIG. 1 of a vehicle or other connection points to the vehicle which may include a fifth wheel. FIG. 4 illustrates that the safety sentry 100 may include an upper member 101 which may be substantially an inverted U-shaped member or may be a curved shape member or other appropriate shape and a lower member 103 which may be a substantially U-shaped member or may be a curved shape member or other appropriate shape.

The upper member 101 may include an upper top section 105 which may extend between a pair of opposing upper side sections 107 which may terminate in a downward extending upper arm member 109 which may connect to a upper connecting plate 119 to connect to a lower connecting plate 131.

The lower member 103 may include a lower bottom section 111 which may extend between opposing lower side section 113 which may terminate in a upward extending lower arm section 115 to connect to the lower connecting plate 131 to connect to the upper connecting plate 119. The lower bottom section 111 may include a hitching device aperture 155 to cooperate with a shaft of a hitching device 139.

The upper connecting plate 119 may include an upper aperture 135 to cooperate with a lower aperture 137 of the lower connecting plate 131. A fastening device 117 such as a bolt may extend through the upper aperture 135 and the lower aperture 137 in order to connect the upper member 101 to the lower member 103.

FIG. 4 additionally illustrates a locking device 133 and key 135 to lock the safety sentry 100 so that the upper member 101 cannot be disconnected from the lower member 103.

Figure 5:
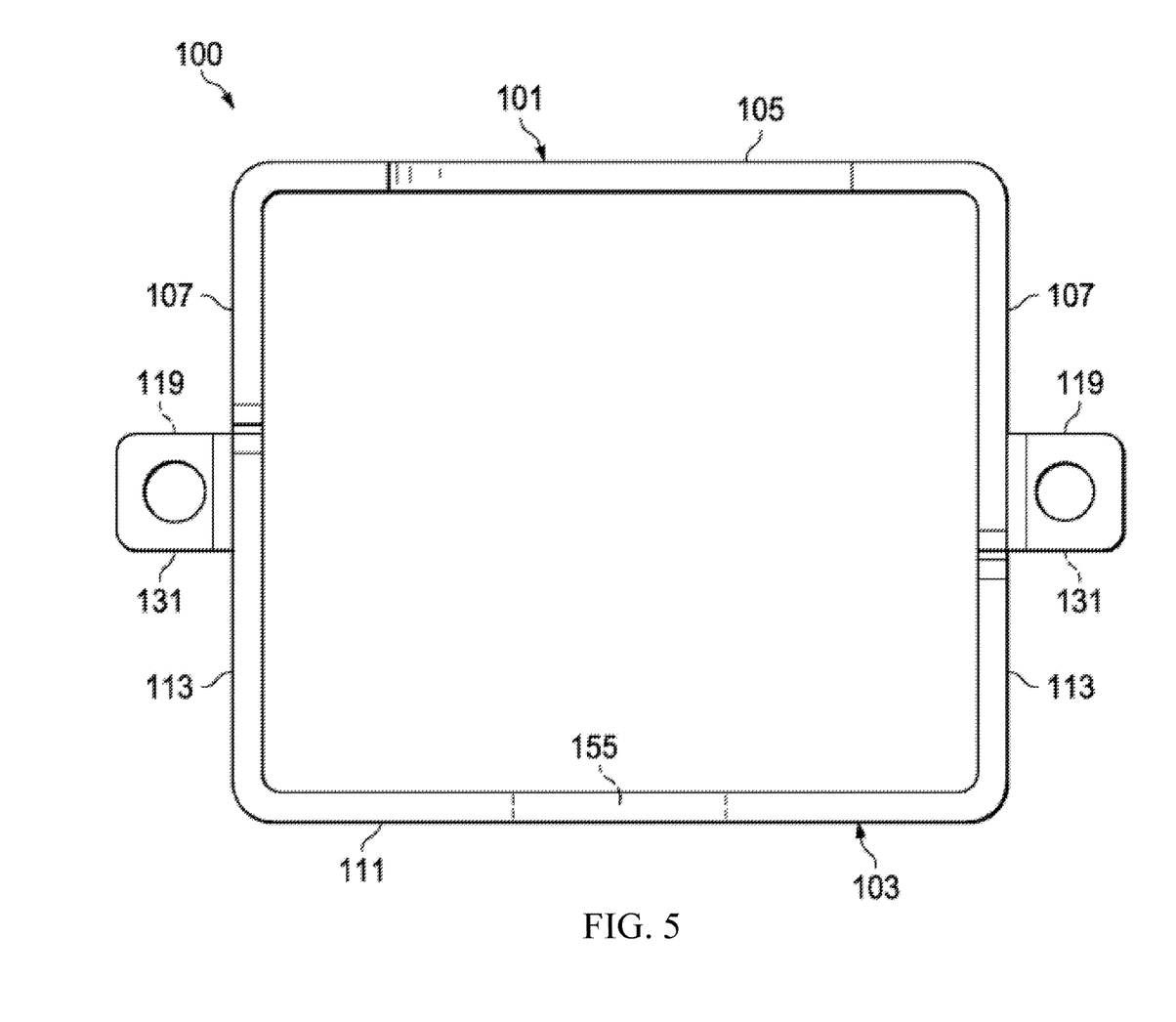
FIG. 5 illustrates a cross-sectional view of the safety sentry in a closed position in accordance with an embodiment of the present invention.

FIG. 5 illustrates a front view of the safety sentry 100. FIG. 5 illustrates that the safety sentry 100 may include an upper member 101 which may be substantially an inverted U-shaped member or may be a curved shape member or other appropriate shape and a lower member 103 which may be a substantially U-shaped member or may be a curved shape member or other appropriate shape.

The upper member 101 may include an upper top section 105 which may extend between a pair of opposing upper side sections 107 which may terminate in a downward extending upper arm member 109 (not shown) which may connect to a upper connecting plate 119 to connect to a lower connecting plate 131.

The lower member 103 may include a lower bottom section 111 which may extend between opposing lower side section 113 which may terminate in a upward extending lower arm section 115 (not shown) to connect to the lower connecting plate 131 to connect to the upper connecting plate 119.

The lower bottom section 111 may include a hitching device aperture 155 to cooperate with a shaft of a hitching device 139 as shown in FIG. 1.

The upper connecting plate 119 may include an upper aperture 135 to cooperate with a lower aperture 137 of the lower connecting plate 131. A fastening device 117 is shown in FIG. 3 such as a bolt may extend through the upper aperture 135 and the lower aperture 137 in order to connect the upper member 101 to the lower member 103. The bolt 117 may be connected to a nut 118.

Figure 6:
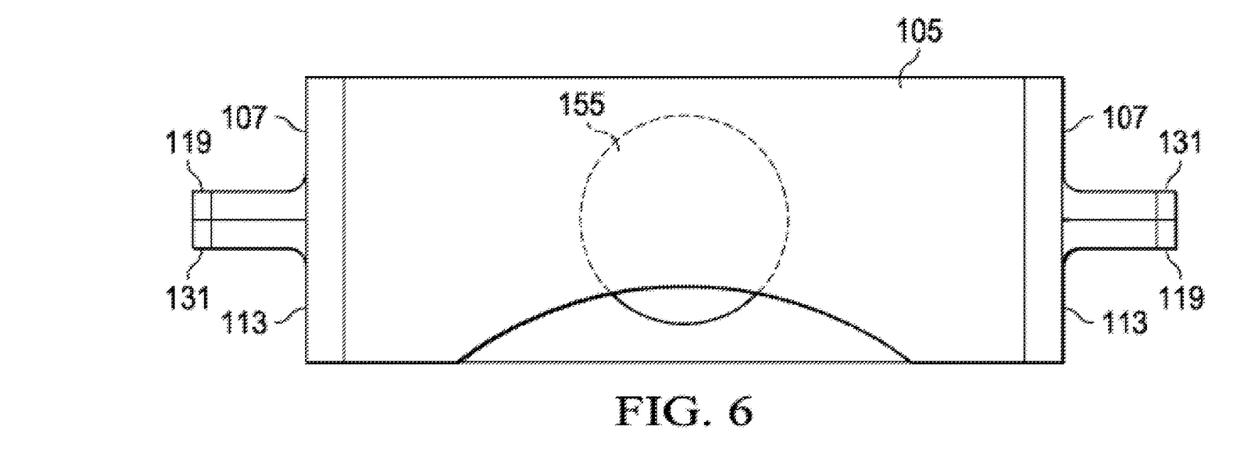
FIG. 6 illustrates a top view of the safety sentry in accordance with an embodiment of the present invention.

FIG. 6 illustrates a top view of the safety sentry 100 and illustrates the upper top section 105 which extends between the upper side sections 107 which may be connected to the upper connecting plate 119 for cooperation with the lower connecting plate 113. The lower connecting plate 131 may be connected to the lower side section 113.

Figure 7:
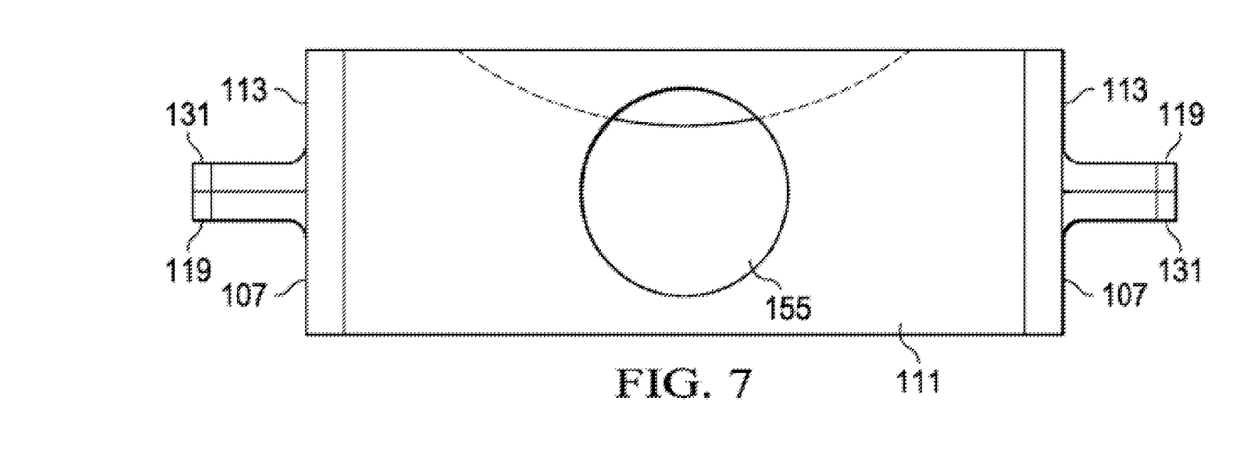
FIG. 7 illustrates a bottom view of the safety sentry in accordance with an embodiment of the present invention.

FIG. 7 illustrates a bottom view of the safety sentry 100 and illustrates the lower bottom section 111 which extends between the lower side sections 113 which may be connected to the lower connecting plate 131 for cooperation with the upper connecting plate 119. The upper connecting plate 119 may be connected to the upper side section 107.

Figure 8:
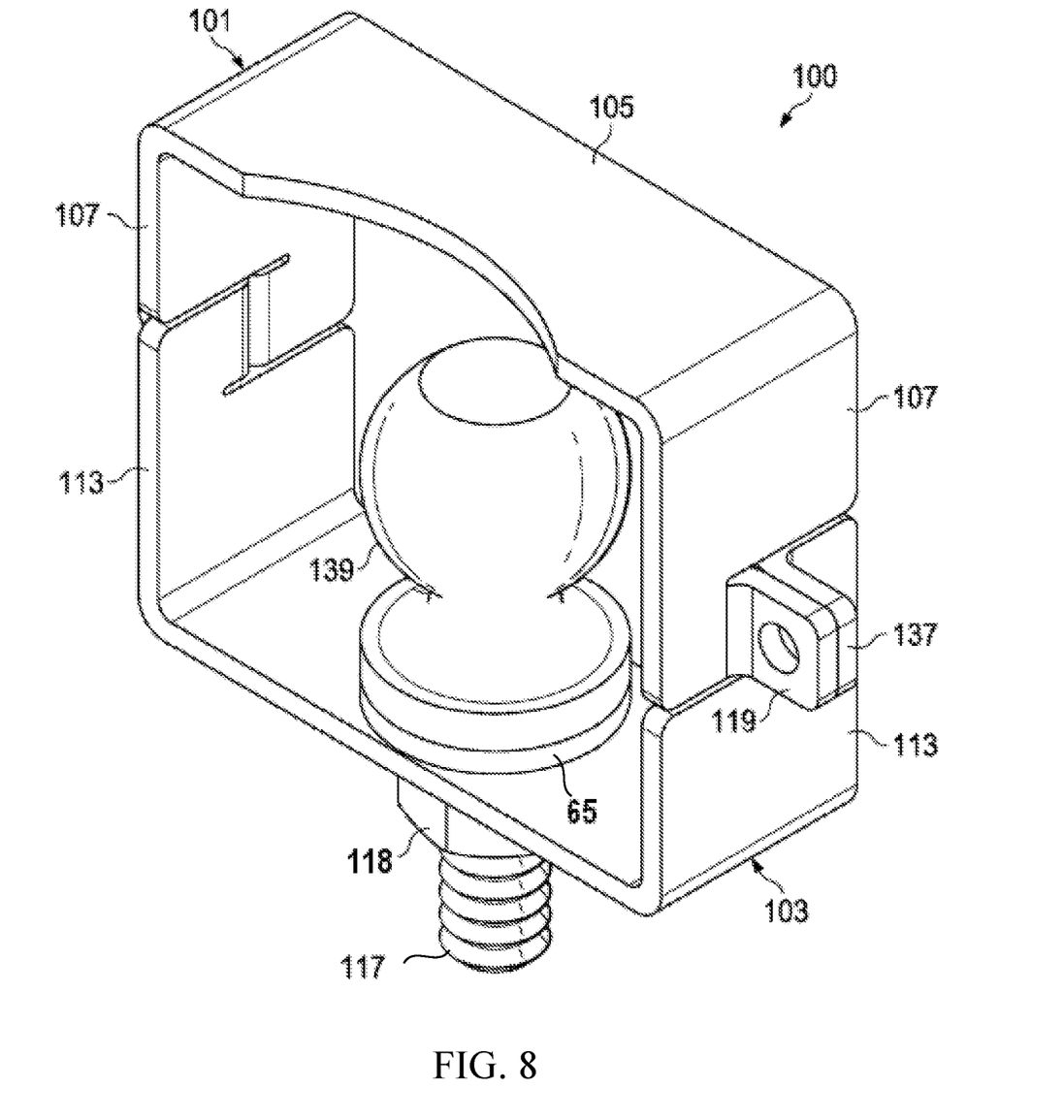
FIG. 8 illustrates a perspective view of the safety sentry in accordance with an embodiment of the present invention.

FIG. 8 illustrates that the safety sentry 100 may include an upper member 101 which may be substantially an inverted U-shaped member or may be a curved shape member or other appropriate shape and a lower member 103 which may be a substantially U-shaped member or may be a curved shape member or other appropriate shape.

The upper member 101 may include an upper top section 105 which may extend between a pair of opposing upper side sections 107 which may terminate in a downward extending upper arm member 109 which may connect to a upper connecting plate 119 to connect to a lower connecting plate 131.

The lower member 103 may include a lower bottom section 111 which may extend between opposing lower side section 113 which may terminate in a upward extending lower arm section 115 to connect to the lower connecting plate 131 to connect to the upper connecting plate 119.

Figure 9:
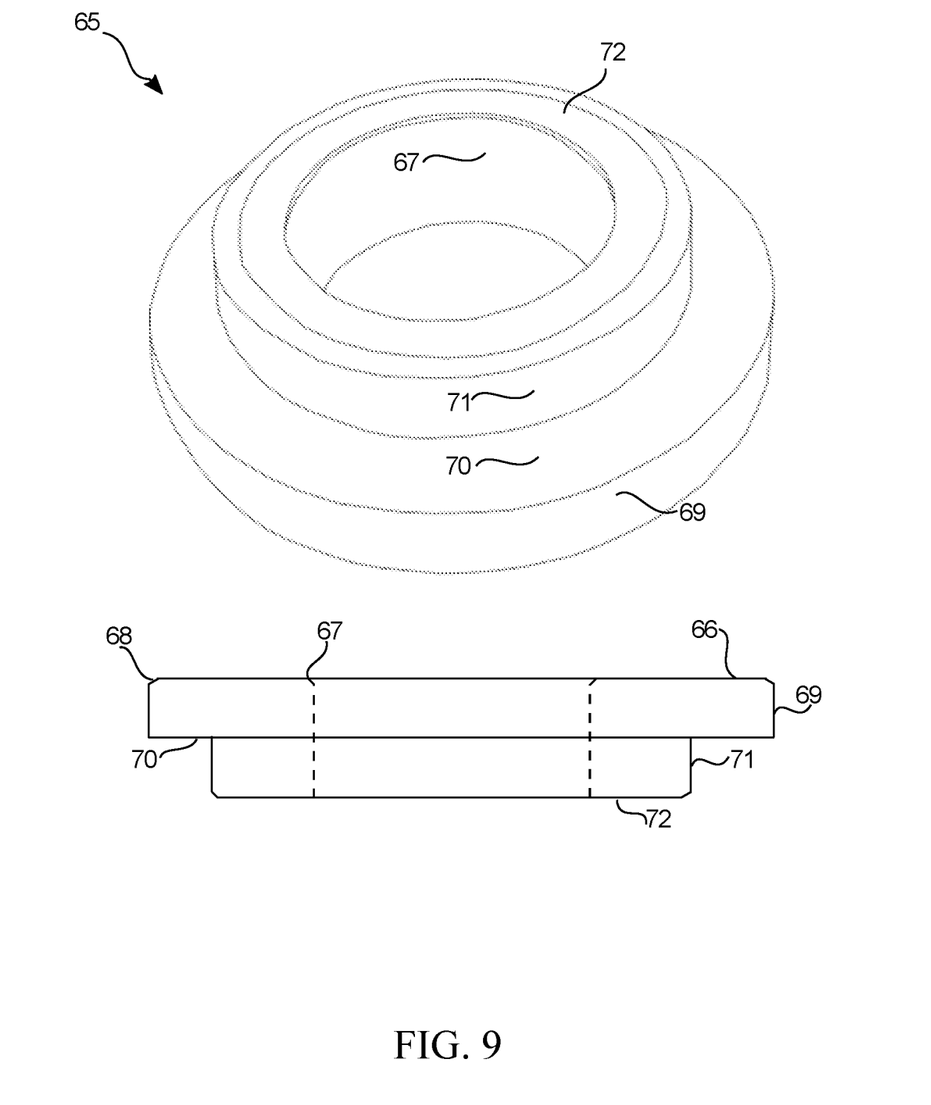
FIG. 9 illustrates a perspective view and a corresponding side elevational view of a step washer configured for a rotatable base in accordance with an embodiment of the present invention.

FIG. 9 illustrates a perspective view and a corresponding side elevational view of a step washer configured for a rotatable base in accordance with an embodiment of the present invention. The step washer 65 forms a solid rotatable base of ball to washer and provides a solid mounting surface without having any type of bending or warping for mounting. The step washer 65 includes a combination flanging washer and a collar washer, comprising a ball mounting surface 66, a chamfered concentric hole 67, a chamfered flange 68, a flange circumference 69, a flange underside 70, a chamfered collar 71 and a collar underside 72. The chamfered collar 71 fits rotatably inside the hitching device aperture 155 (not shown). The flange underside 70 rotates atop the lower bottom surface 111 of the lower member 103 (not shown). The collar underside 72 provides a fastening surface for the fastening nut 118 (not shown) to rotatably fasten the hitching ball 139 (not shown) and associated bolt to the lower member 103.

A Nylon® reinforced lock nut or a similar product is used with this product. The Nylon becomes imbedded in the threads 117 of the trailer ball 139 to secure the ball and product to mounting base without becoming loose or backing off from a secure position. The lock nuts remove the use of standard lock washer and nut to allow clearance for product when installed. The lock nut does not change the integrity of the ball strength or weight capacity.

A thickness of a hasp insert installed allows a swivel ability for turning of the product. A hasp is any of several devices for fastening a door or lid consisting of a hinged metal strap that fits over a staple and is secured by a pin or padlock. When the step washer is in place, the 0.4000 additional thickness allows a pivot point for Hasp motion.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclose Therefore, the present disclosure satisfies the long felt need for an economical, secure and convenient bicycle water bottle phone holder that is also able to accommodate other personal effects. The disclosed non-handlebar mounted bicycle water bottle phone holder allows a rider to easily access the phone without stopping the bicycle. The disclosure also provides a safe, secure and functional space for a phone and personal effects apart from a rider's person, clothing and special dedicated mounts on a bicycle.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A trailer hitch guide for restraining a trailer hitch, comprising holder comprising:
   an upper member configured to restrain a movement of the trailer hitch;
   a lower member defining a hitching aperture and configured to connect to the upper member and to connect to a vehicle, wherein the upper member is rotatably connected to the lower member; and a step washer including a flanging washer concentric with a collar washer, the flanging washer comprising a ball mounting surface, the collar washer configured to fit rotatably inside the hitching aperture of the lower member;

wherein a clearance 'a' between an apex of a trailer hitch cup and a bottom surface of the upper member is less than a dimension 'b' representing a height of the trailer hitch cup, and a ratio a/b less than one configured to prevent an escape of the trailer hitch from the trailer hitch guide, and a ratio of one configured to allow an escape of the trailer hitch from the trailer hitch guide, and wherein a stacked step washer between a base of a hitch ball and the trailer hitch guide put into place during hitching reduces the ratio 'a' to 'b' to improve a safety margin to failure.

2. A trailer hitch guide for restraining a trailer hitch as in claim 1, wherein the step washer further comprises a flange underside configured to rotate atop a lower bottom surface of the lower member.

3. A trailer hitch guide for restraining a trailer hitch as in claim 1, wherein the step washer further comprises a collar underside configured to provide a fastening surface for a fastening nut.

4. A trailer hitch guide for restraining a trailer hitch as in claim 1, wherein the ball mounting surface further comprises a concave chamfered inside circumference configured to receive an underside portion of a hitching ball.

5. A trailer hitch guide for restraining a trailer hitch as in claim 1, wherein the lower member is substantially U-shaped.

6. A trailer hitch guide for restraining a trailer hitch as in claim 1, wherein the upper member includes an upper side section.

7. A trailer hitch guide for restraining a trailer hitch as in claim 6, wherein the upper side section includes an upper arm section.

8. A trailer hitch guide for restraining a trailer hitch as in claim 1, wherein the lower member includes a lower side section.

9. A trailer hitch guide for restraining a trailer hitch as in claim 8, wherein the lower side section includes a lower arm section.

10. A trailer hitch guide for restraining a trailer hitch as in claim 7, wherein the upper arm section is connected to an upper connecting plate.

11. A trailer hitch guide for restraining a trailer hitch as in claim 9, wherein the lower arm section is connected to a lower arm connecting plate which cooperates with the upper connecting plate to restrain the upper member from rotating with respect to the lower member.

12. A trailer hitch guide for restraining a trailer hitch as in claim 10, wherein the upper connecting plate is connected to the lower connecting plate with a fastening device.

13. A trailer hitch guide for restraining a trailer hitch as in claim 1, wherein the trailer hitch guide further includes a locking device to prevent the rotation of the upper member with respect to the lower member.

14. A trailer hitch guide for restraining a trailer hitch as in claim 1, wherein the upper member and the lower member are substantially symmetrical to each other and to themselves.

* * * * *